United States Patent [19]

Lu et al.

[11] E Re. 28,516

[45] Reissued Aug. 12, 1975

[54] POLYMERIC REAR PROJECTION SCREENS

[75] Inventors: Chen-I Lu; Edward D. Morrison, both of Rochester, N.Y.;

[73] Assignee: Eastman Kodak Company Rochester, N.Y.

[22] Filed: Mar. 29, 1973

[21] Appl. No.: 345,921

Related U.S. Patent Documents

Reissue of:

[64] Patent No.: 3,573,141
Issued: Mar. 30, 1971
Appl. No.: 838,304
Filed: July 1, 1969

[52] U.S. Cl. ..... 428/213; 428/323; 428/326; 428/332

[51] Int. Cl. ..... C03b 21/60; C08f 45/14

[58] Field of Search ..... 428/323, 326, 332; 260/41 C, 94.9 F, 96 PC; 350/127, 162

[56] References Cited

UNITED STATES PATENTS 2,480,031 8/1949 Kellogg ..... 161/3.5

3,367,926 2/1968 Voeks ..... 260/94.9 X

OTHER PUBLICATIONS

Kuhre, C. J., et al. "Crystallization–Modified Polypropylene," SPE Journal, Oct. 1964, pp. 1113–1119.

*Primary Examiner*—Mayer Weinblatt
*Assistant Examiner*—Edith R. Buffalow
*Attorney, Agent, or Firm*—E. W. Milan

[57] ABSTRACT

Rear projection screens that consist essentially of polypropylene can be improved significantly by incorporating into the screen one or more "crystal deforming" additives, such as finely divided starch, sucrose octoacetate [and] cellulose acetate butyrate, *and calcium carbonate* which additives (a) are essentially non-nucleating in their effect on the crystal structure of the screen material, (b) are able to deform the spherulites in the crystal structure to thereby increase light diffusion, and (c) have refractive indices within ± 0.05 of that of the polypropylene in the screens.

19 Claims, 1 Drawing Figure

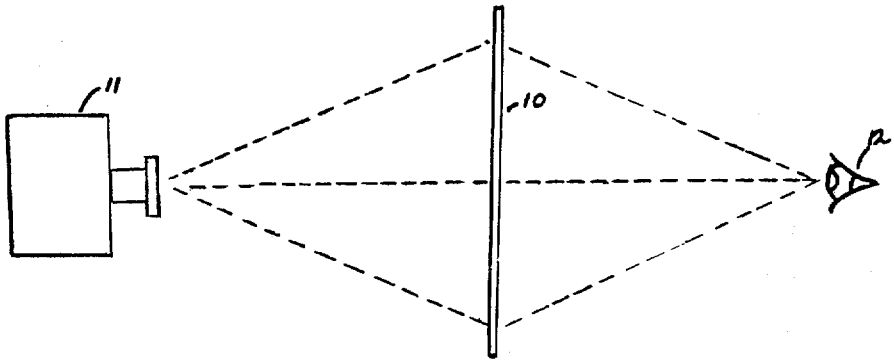
11
10
12

POLYMERIC REAR PROJECTION SCREENS

Matter enclosed in heavy brackets [ ] appears in the original patent but forms no part of this reissue specification; matter printed in italics indicates the additions made by reissue.

---

The present invention relates to polymeric rear projection screens in which the polymeric portion of the screens consist essentially of polypropylene. The screens additionally contain, dispersed therethrough, one or more "crystal deforming agents," which have the peculiar ability to improve that property of the screens relating to "hot spot" without detracting substantially from the other excellent optical properties of the screens.

In copending U.S. patent application Ser. No. 838,528 filed July 1, 1969, special processes for manufacturing rear projection screens made from molten polypropylene are described in detail. Also described in detail in said copending patent application are the resulting valuable screen materials. These polypropylene screen materials perform under actual use conditions in a manner that is considered excellent. Apparently the valuable optical properties of such screen materials are due to the unique arrangement (and relative proportions) of regions of crystalline and relatively amorphous polypropylene in the sheets, as well as the sizes and types of crystals involved in those regions. Thus, in such sheets, there is a central "core" of almost totally crystallized polypropylene (which "core" is at least three-fourths of the thickness of the sheets). On either side of this "core" there is a layer of apparently relatively less crystallized polypropylene (in a sandwich-like arrangement) with the less crystallized layers being at the surfaces of the sheets (which sheets in turn are from about 20 to about 80 mils thick, and preferably are from about 25 to about 60 mils thick). The entire screen, however, is composed of at least about 60 weight percent (preferably from about 70 to about 90%) of spherulite structures having average diameters (measured at their widest point) of from about 5 to about 20 microns. The larger spherulite crystals in the "core" of such valuable polypropylene rear projection screen materials have diameters of from about 15 to about 45 microns (preferably from about 20 to about 40 microns) at their widest point. The largest crystals in the outer, less crystalline "sandwich" layers at the sheet surfaces are almost invariably smaller than 10 microns in diameter. The processes for manufacturing such sheets entails, briefly, (a) casting or extruding a "melt" consisting essentially of polypropylene in the form of the fairly thick sheet onto a "heat transfer" surface maintained at a temperature which is low enough to cause only the surface layer(s) of the sheet to harden sufficiently to maintain the form integrity of the sheet (generally at a heat transfer surface temperature of from about 85° C. to about 170° C.), and (b) thereafter cooling the sheet in such a way (in an area in which the surfaces of the sheet are maintained at from about 85° C. to about 140° C.) to form the desired, largely crystalline "core" having the requisite spherulite sizes, and distribution.

The evaluation of rear projection screens can be described in terms of four separate, distinct optically appreciative elements; namely, in terms of (1) "contrast," (2) "brightness," (3) "scintillation" and (4) "hot spot." An ideal rear projection screen has practically no "hot spot" (an area on the screen which is distinctly brighter than the remainder of the screen), practically no "scintillation" (the appearance of tiny, sparkling spots over the surface of the screen), maximum contrast and high brightness. Of these "elements," the elimination of "hot spot" and "scintillation" are of perhaps primary importance, because these tend to induce eye fatigue with any long period of continual viewing. One method for determining the relative merits and the relative acceptability of a given rear projection screen material is to separately evaluate the material for each of these four major "elements" in a somewhat subjective manner as follows:

A method by which the relative merits and acceptability of a given rear projection screen material can be evaluated for each of the aforementioned characteristics in a somewhat subjective manner is to assign a progressive numerical value for each of the characteristics. For example, if a value of 0–9 is assigned to each characteristic with a rating of 0 being indicative of the very poorest quality and a rating of 9 being indicative of the best possible quality, then the evaluated numerical rating for each of the four characteristics can be added together to determine a particular quality or "Q rating" for any given screen material. Such evaluations are assigned when a material is tested under actual conditions by projecting an image on the screen in a conventional manner. By this method a theoretically perfect screen would have a "Q rating" of 36 and a screen of inferior quality would have a correspondingly lower "Q rating." This method, as described above, is not all inclusive because it relies on an individual's visual analysis which can and will vary from person to person. However, the method does provide a way of evaluating the characteristics of different screen materials so that at least a subjective comparison can be made. A more practical "Q rating" might be obtained, if the same evaluations were made by several persons and then averaged.

A conventional rear projection screen (A) comprising a glass plate coated with a wax diffusing layer has a "Q rating" of 24 which was determined as follows:

SCREEN A

| | |
|---|---|
| Hot spot | 9 |
| Scintillation | 2 |
| Contrast | 8 |
| Brightness | 5 |
| Q rating | 24 |

This evaluation shows that the screen scintillates considerably and that the image is not particularly bright. While one evaluation might give a high "Q rating," another might give a lower rating, such that an average can be obtained. The average becomes more meaningful as the number of evaluations by different people of the same screen is increased. Several other commercially-available screens have been rated by this method as follows:

| Screen | Hot spot | Scintillation | Contrast | Brightness | Q rating |
|---|---|---|---|---|---|
| B | 7 | 8 | 9 | 4 | 28 |
| C | 9 | 2 | 9 | 4 | 24 |

By comparison, a rear projection screen of the invention of said copending U.S. patent application Ser. No. 838,528 was evaluated as follows:

SCREEN I

| | |
|---|---|
| Hot spot | 7 |
| Scintillation | 8 |
| Contrast | 9 |
| Brightness | 7 |
| Q rating | 31 |

From the "Q ratings" and individual "element" evaluations set out above for the conventional screens (A, B and C), it can be appreciated that in each instance, the commercially available rear projection screen had at least one major shortcoming, which, in fact, detracted significantly from its overall desirability as a rear projection screen. These are typical data for conventional rear projection screens.

Although such polypropylene screens as those described and claimed in said copending patent application have significantly improved properties, as compared with conventional rear projection screens, it has now been discovered that still better properties can be imparted to the polypropylene rear projection screen materials, provided that at least about 2 (preferably from about 4 to about 15, and usually at most about 20) weight percent, based on the weight of the resulting screen material, of one or more special additive which will herein sometimes be referred to as a "crystal deforming material" (in finely divided form) is also present, uniformly dispersed through the sheet of rear projection screen material. The special additives that are useful in the successful practice of this invention are called "crystal deforming materials or agents" because of what is believed to be the mechanism whereby the major beneficial effect upon the ultimate performance of the rear projection screens of this invention (the substantial elimination of the undesired "hot spot" effect described hereinbefore) is accomplished.

Thus, the "crystal deforming agents" of this invention apparently increase light diffusion by deforming the shape of the growing spherulites in the polymer sheet as it cools from the melt. This mechanism may be described as follows. Crystallizable polypropylene in the molten state has essentially no crystals. As this material is extruded through a sheet forming die and cast onto a cooling roll it solidifies and crystallization begins. The rate of cooling determines the size and type of crystalline material formed. Fast cooling produces small spherulites and relatively clear sheet. Slow cooling produces large spherulites and translucent sheet. Copending U.S. patent application 838,528, filed concurrently herewith, describes the method of producing rear projection screens to form a heterogeneous structure having spherulites of varying sizes and comprised of at least two or more types of the four type of polypropylene spherulites. (A review of crystal morphology of polypropylene is given in "Polymer Single Crystals" by P. H. Geil, Interscience Publishers, 1963.) The valuable optical characteristics of these screens are believed to be due to an almost totally crystalline central "core" (composed of the aforementioned heterogeneous structure having spherulites of varying types and sizes) which "core" comprises at least three fourths of the thickness of the sheets.

In this present application "crystal deforming agents" are added to increase even further the heterogeneous structure formed by slow cooling. Photomicrographs reveal that these agents are not incorporated into the growing spherulite itself (such as nucleating agents), but are pushed aside as the crystalline structure develops until finally they are squeezed between spherulites and deform the normally spherical shape of the spherulite. These deformed spherulites have increased light diffusion capabilities. For rear projection use this effect is very desirable for it reduces "hot spot" (an area on the screen which is distinctly brighter than the remainder of the screen) and also permits use of a thinner screen. By reducing screen thickness more light transmission results which increases brightness and usually contrast as well.

Materials that can be used successfully as "crystal deforming materials" in the practice of this invention are those powdered materials (a) having particles substantially within the range of from about 5 to about 50 microns (wherein the average diameter of said particles is from about 10 to about 30 microns), (b) having a refractive index within about 0.05 unit of that of the polypropylene in the rear projection screens, and (c) having the capability of being present in the molten sheet while it is being solidified (and while the crystals therein are being formed and growing) without causing a significant amount of additional crystal nucleation (as compared to that which ordinarily occurs under similar conditions, but in the absence of the "crystal deforming material"). Materials having this latter capability (which materials will herein sometimes be referred to as "non-nucleating" materials) can readily be identified by simply preparing a 10 weight percent dispersion of the particular material in molten propylene, casting on a steel plate and pressing it into a 30 mil layer of the molten mixture, and permitting the resulting layer to solidify under ambient room temperature conditions. Layers that contain "non-nucleating" materials develop a highly opaque appearance, whereas those that cause an undesirable degree of nucleation cause the polypropylene films to appear almost clear when they are cooled and produce severe hot spot. (The nucleation induces the formation of many crystals of very small size which are unable to produce the high degree of light diffusion necessary for rear projection screen use.) An example of a finely divided material having the requisite refractive index (detailed above), but which does not qualify as a "crystal deforming material" useful in the practice of this invention is finely divided silica. This material is a powerful nucleating agent, causing the formation of an extremely clear polypropylene sheet (which therefore is not acceptable as a rear projection screen) when it is tested as a potential "crystal deforming material" in this context.

Examples of "crystal deforming materials" that are utilized in the formation of some of the preferred embodiments of this invention are starch, sucrose octoacetate and cellulose acetate butyrate. Screens or sheets consisting essentially of (a) polypropylene [ , ] *with* (b) one or more *of said* "crystal deforming materials" [plus] *and/or* (c) powdered calcium carbonate constitute still another group of preferred embodiments of this invention. *The powdered calcium carbonate employed in such embodiments inherently meets the criteria described hereinbefore for "crystal deforming materials" and, therefore, can be used as the sole "crystal*

*deforming material" as well as in combination with other "crystal deforming materials" in practicing the invention.*

EXAMPLE 1

Eleven parts of 20–25 micron average particle size wheat starch powder (having a refractive index of 1.50) are prepared for admixture with crystallizable polypropylene by first blending the starch with an equal volume of xylene in which 0.33 part of amorphous polypropylene is dissolved, and then removing the xylene by a slow evaporation procedure. The resulting coated starch particles are then dry blended with 100 parts of polypropylene the polypropylene having a melt viscosity of 2.5, a density of 0.90 gram/cc., and a refractive index of 1.49). The resulting blend is then melted and extruded at a temperature of 200° C. directly onto the surface of a steel roll, which surface is maintained at 90° C. The thickness of the sheet is 30 mils. The temperature of the air surrounding the roll is maintained at 93° C. The diameter of the cool roll is 2.5 inches, and the sheet is cast continuously at a rate of 3 ft. per minute. The total amount of time during which the extruded sheet is maintained in contact with the surface of the cool roll is 9 seconds, this time being sufficient to cause the surface of the sheet to "set up," thereby forming thin layers of polypropylene of low crystallinity at both surfaces of the sheet. The sheet is then passed onto the surface of a second roll of the same type and maintained under the same conditions. Upon leaving the surface of the second of these relatively cool rolls the sheet is dropped into a vertical chamber in which the air temperature is maintained at 93° C. The surface of the sheet and the air surrounding the sheet are maintained at about this temperature for a total of 90 seconds by passing the sheet before a series of electric heaters mounted along the rolls of the chamber. During the period of time in which the sheet is passed through the vertical chamber, an extensive translucency is observed developing in the sheet. This results from the formation of a multiplicity of the relatively larger crystals of the necessary size in the "core" of the sheet. The sheet is then removed from the chamber and cooled under ambient conditions to room temperatures, at which point it is cut into individual sheets, which in turn are pressed in a conventional hydraulic press under a pressure of 140 p.s.i. between one very smooth steel plate and one steel model plate having the desired roughened surface of 25 microinches. The resulting sheet yields a "Q Rating" of 33. When tested in a conventional rear projection apparatus, in which microfiches recorded on a sheet of colored transparent film are used, it is observed that this screen transmits a very sharp image which is not only very free of undesirable haze but is also a true rendition of the colored material on the original microfiche.

It has been found that the polypropylene that can be used successfully in the practice of this invention are those crystallizable polypropylenes having a melt flow rate or viscosity (measured in dg./min. at 230° C. under a 2.16 kg. load; A.S.T.M. standard test D 1238) of below about 90, preferably between about 1.5 and about 10. Other materials that do not detract substantially from the crystallite distribution and sizes described hereinbefore can also be present in the screen materials of this invention.

EXAMPLE 2

A screen is prepared as in Example 1, except that 5 parts of very finely powdered (10–40 micron diameter particles) sucrose octoacetate are used in place of the starch.

EXAMPLE 3

A screen is prepared as in Example 1, except that 5 parts of finely divided cellulose acetate butyrate (intrinsic vicosity=1.5, 13% acetyl, 38.1% butyryl, 1.87% hydroxyl) are used in place of starch.

Ratings for rear projection screens produced in accordance with the above examples are as follows:

| Example | Hot spot | Scintillation | Contrast | Brightness | Q rating |
|---|---|---|---|---|---|
| 1 | 9 | 8 | 9 | 7 | 33 |
| 2 | 8 | 8 | 9 | 8 | 33 |
| 3 | 9 | 8 | 9 | 7 | 33 |

As it was pointed out in the copending patent application described above, and as set out in the latter part of the above example, it is sometimes desirable to have one of the surfaces of rear projection screens uniformly and randomly roughened to the extent of from about 10 to about 30 microinches, and preferably from about 15 to 25 microinches (as measured by a commercial surface roughness analyzer such as the "Bendix Proficorder"). The roughness should be random in nature such as that obtained by sandblasting, etching, and the like. The roughened surface can be applied to the rear projection screens of this invention by any of a number of ways, including that set out in Example 1. Also, when the screens are to be used to read negative materials for any extended period of time, it is preferable to view the negative materials through a relatively darker, neutral density colored layer. Thus, in a special adaptation of this invention, sufficient neutral density dye (or combination of dyes) can be either added to the polypropylene (or coated on the screen material) in amounts sufficient to produce an increase in diffuse density in the resulting composition of as much as 0.1 or more (but preferably at most about 0.2). Alternatively, a thin, transparent, neutral density dyed, polymeric film can be utilized in combination with the special screen material described above, if desired. (In this instance, the surface of the screen material facing the person using the viewer need not be roughened, but one surface of the neutral density film material can be roughened).

Consequently, a particularly preferred embodiment of the present invention relates to a polymeric article comprising a polypropylene screen layer or sheet as detailed hereinbefore [which consists essentially of the mixture of crystallized polypropylene and crystal deforming agents(s)], and a "neutral color" density dyed polymeric film having a diffuse density of at most about 0.2, one outer surface of said article having the specially roughened surface described above.

Following a procedure such as that of Example 1, above, several other materials have been evaluated as being possibly useful as "crystal deforming materials" in polypropylene rear projection screens with varying poor effects. None of the materials, however, proved acceptable for this use. Materials tested without success included silica, titanium dioxide, talc, magnesium silicate, clay and carbon black.

Referring now to the accompanying drawing;

The FIGURE is a schematic view showing the arrangement of a rear projection screen relative to a projector and a viewer.

The invention has been described in detail with particular reference to preferred embodiments thereof, but it will be understood that variations and modifications will be effected within the spirit and scope of the invention.

What is claimed is:

1. In a polymeric sheet especially adapted for use as a rear projection screen; said sheet (a) consisting essentially of polypropylene having a melt flow rate of at most about 90, (b) having a thickness [of from about 20 to about 80 mils] *such that it transmits light;* and (c) having two surface layers containing relatively smaller crystalline spherulites and a core layer containing relatively larger crystalline spherulites; the diameter of the larger crystals in said core layer being between about 15 and about 45 microns and said core layer being at least three-fourths as thick as said sheet, and said sheet containing at least about 60 weight percent of crystalline spherulites having average diameters of from about 5 to about 20 microns;

the improvement which comprises incorporating evenly through said sheet at least about 2 weight percent of finely divided, particulate "crystal deforming material," said crystal deforming material (i) being non-nucleating, (ii) having a refractive index within about 0.05 unit of that of said polypropylene, and (iii) having particle diameters in the range of from about 5 to about 50 microns.

2. An improved rear projection screen material as in claim 1, wherein said "crystal deforming material" is starch.

3. An improved rear projection screen material as in claim 1, wherein said "crystal deforming material" is sucrose octoacetate.

4. An improved rear projection screen material as in claim 1, wherein said "crystal deforming material" is cellulose acetate butyrate.

5. An improved rear projection screen material as in claim 1, wherein said polymeric sheet has one randomly roughened surface; the roughness of said roughened surface being about 10 to about 25 microinches.

6. An improved rear projection screen material as in claim [1] *2*, wherein said screen [also] contains from about 1 to about 10 weight percent of finely divided calcium carbonate *as a "crystal deforming material."*

7. A polymeric sheet consisting essentially of polypropylene having a melt flow rate between about 1.5 and about 10 and at least one "crystal deforming material" said sheet (a) having a thickness [of from about 20] *up* to about 80 mils and (b) having two surface layers containing relatively smaller crystalline spherulites and a core layer containing relatively larger crystalline spherulites; the diameter of the larger crystals in said core layer being from about 15 to about 45 microns, measured at their widest point, said sheet containing at least about 60 weight percent of crystalline spherulites having average diameters of from about 5 to about 20 microns, and said core layer being at least three-fourths of the thickness of said sheet, and said "crystal deforming material"

(a) being present in said sheet in an amount equal to from about 4 to about 15 weight percent of said sheet;

(b) having a refractive index within about 0.05 unit of that of said polypropylene;

(c) consisting essentially of particles having maximum diameters of from about 5 to about 50 microns; and (d) being non-nucleating with respect to the crystallization of said polypropylene.

8. A polymeric sheet as in claim 7, wherein said "crystal deforming material" is starch.

9. A polymeric sheet as in claim 7, wherein said "crystal deforming material" is sucrose octoacetate.

10. A polymeric sheet as in claim 7, wherein said "crystal deforming material" is cellulose acetate butyrate.

11. A polymeric sheet as in claim 7, wherein said sheet has one randomly roughened surface; the roughness of said roughened surface being from about 10 to about 25 microinches.

12. A polymeric sheet as in claim 11, wherein said "crystal deforming material" is starch.

13. A polymeric sheet as in claim 11, wherein said "crystal deforming material" is sucrose octoacetate.

14. A polymeric sheet as in claim 11, wherein said "crystal deforming material" is cellulose acetate butyrate.

15. A multi-layer article comprising (a) a polymeric sheet as in claim 7, and (b) a neutral color density polymeric film having a diffuse density of at most about 0.2;

one outer surface of said article being randomly roughened and having a roughness of from about 10 to about 25 microinches.

*16. An improved rear projection screen material as in claim 1, wherein said "crystal deforming material" is calcium carbonate.*

*17. A polymeric sheet as in claim 7, wherein said "crystal deforming material" is calcium carbonate.*

*18. An improved rear projection screen material as in claim 1 wherein the sheet has a thickness of from about 20 to about 80 mils.*

*19. A polymeric sheet as in claim 7, wherein the sheet has a thickness of from about 20 to about 80 mils.*

* * * * *